(12) United States Patent
Stein et al.

(10) Patent No.: US 10,674,052 B1
(45) Date of Patent: Jun. 2, 2020

(54) COMMON COVER LENS FOR CAMERA AND ILLUMINATORS

(71) Applicant: VALEO NORTH AMERICA, INC., Troy, MI (US)

(72) Inventors: Gregory Stein, Seymour, IN (US); Jon Beauchamp, Seymour, IN (US); John Orisich, Seymour, IN (US); Brant Potter, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/217,145

(22) Filed: Dec. 12, 2018

(51) Int. Cl.
*H04N 5/225* (2006.01)
*B60R 1/00* (2006.01)
*G02B 3/00* (2006.01)

(52) U.S. Cl.
CPC .......... *H04N 5/2254* (2013.01); *B60R 1/002* (2013.01); *G02B 3/0037* (2013.01); *H04N 5/2252* (2013.01); *H04N 5/2256* (2013.01); *B60R 2300/105* (2013.01); *B60R 2300/106* (2013.01); *B60R 2300/802* (2013.01); *B60R 2300/8093* (2013.01)

(58) Field of Classification Search
None
See application file for complete search history.

(56) References Cited

U.S. PATENT DOCUMENTS

| | | | |
|---|---|---|---|
| 5,001,558 A | 3/1991 | Burley et al. | |
| 7,217,020 B2 | 5/2007 | Finch | |
| 9,645,008 B2 * | 5/2017 | Jia | G01J 1/4204 |
| 2001/0019482 A1 | 9/2001 | Kobayashi et al. | |
| 2010/0321497 A1 * | 12/2010 | Onishi | B60R 1/10 348/148 |
| 2016/0119527 A1 | 4/2016 | Shahid et al. | |
| 2017/0257546 A1 | 9/2017 | Shahid | |
| 2018/0191930 A1 * | 7/2018 | Jeong | H04N 5/2252 |
| 2019/0068857 A1 * | 2/2019 | Gruhlke | H04N 5/23238 |
| 2019/0291658 A1 * | 9/2019 | Bingle | H04N 5/2254 |

FOREIGN PATENT DOCUMENTS

| | | |
|---|---|---|
| EP | 1 739 344 A1 | 1/2007 |
| EP | 3 407 591 A1 | 11/2018 |
| JP | 2005-41240 A | 2/2005 |

OTHER PUBLICATIONS

International Search Report and Written Opinion of the International Searching Authority dated Feb. 26, 2020, in PCT/US2019/065998, filed Dec. 12, 2019.

* cited by examiner

*Primary Examiner* — James M Hannett
(74) *Attorney, Agent, or Firm* — Oblon, McClelland, Maier & Neustadt, L.L.P.

(57) ABSTRACT

A compact digital camera and infrared (IR) illuminator apparatus, including IR illuminators arranged adjacent to the digital camera. The digital camera has a camera lens and each IR illuminator includes IR LEDs. A single cover lens is positioned to cover the at least one IR LED and the camera lens. A region of the single cover lens that covers the IR LEDs blocks visible light and a region of the single cover lens that covers the camera lens is a neutral lens that transmits visible light. The single cover lens is a two-shot molded lens or a three-shot molded lens.

20 Claims, 5 Drawing Sheets

“COMMON COVER LENS FOR CAMERA AND ILLUMINATORS”

BACKGROUND OF THE INVENTION

Field of the Invention

The present disclosure relates generally to a cover lens for a vehicle camera and illuminators, and in particular, two-shot or three-shot lens for a camera and adjacent illuminators.

Description of the Related Art

Camera systems play an important role in autonomous vehicles and in various driver assist applications to aid vehicle drivers. Among various sensors used in autonomous vehicles, cameras are the main sensor technology that can capture color and contrast information at a level of detail that enables object classification. Vision cameras enable driver assist system applications such as adaptive cruise control, automatic emergency braking, forward collision warning, automatic high beam control, traffic sign recognition, lane keep systems, parking assist, cross-traffic alert, and rear-view mirror. Vision cameras may also be included inside the vehicle cabin for such features as gaze tracking, presence detection and gesture recognition. Although cameras may be mounted on a vehicle roof, they are increasingly being arranged at other sections of a vehicle such as along the side or even front of a vehicle. Vision cameras arranged in low areas of a vehicle including the side or front sections are especially susceptible to weather conditions and variations in lighting.

For purposes of general illustration, a typical sensor arrangement for an autonomous vehicle is shown in FIG. 1. The arrangement of FIG. 1 may include several vision cameras, such as forward stereo cameras, surround cameras, rear and side cameras. Vision cameras 105, 107, 109 may facilitate features including traffic sign recognition, lane departure warning, digital side mirror, park assist, and rear view. Vision cameras may be mounted at various positions of a vehicle. It is desirable to mount some vision cameras in lower sections of a vehicle, which may include locations near a vehicle wheel well. However, cameras located in these low positions are vulnerable to road debris and other objects that may come in contact with a camera and possibly cause damage to a camera lens.

SUMMARY OF THE INVENTION

An aspect is a compact digital camera and infrared (IR) illuminator apparatus, including a plurality of IR illuminators arranged adjacent to the digital camera, the digital camera having a camera lens, each IR illuminator including at least one IR light emitting diode (LED), and a single cover lens positioned to cover the at least one IR LED and the camera lens. A region of the single cover lens that covers the at least one IR LED blocks visible light and a region of the single cover lens that covers the camera lens is a neutral lens that transmits visible light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
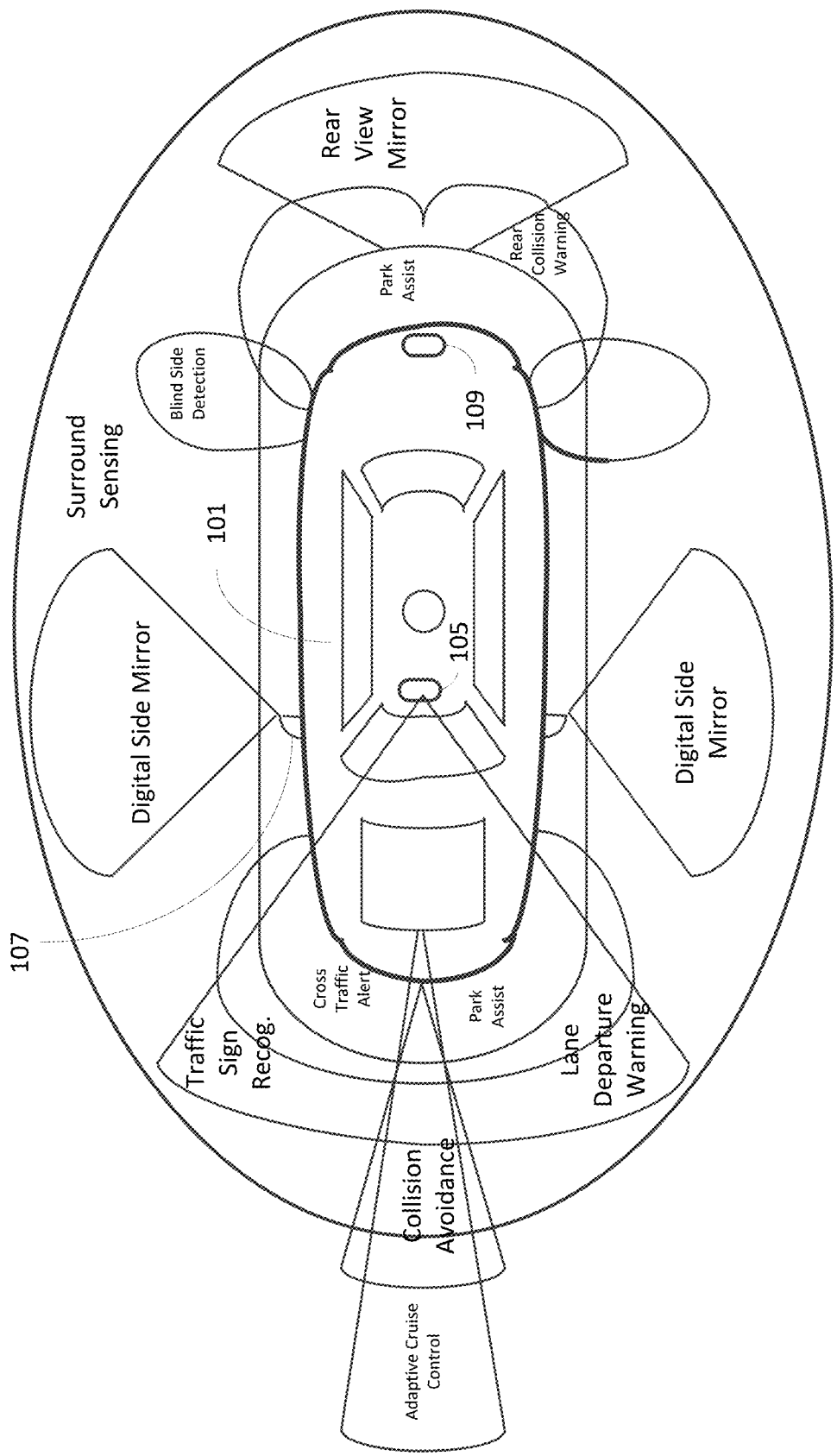
FIG. 1 illustrates a typical sensor arrangement for an autonomous vehicle.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

Referring now to the drawings, wherein like reference numerals designate identical or corresponding parts throughout the several views.

In order to obtain video information for detecting objects in the field of view of the vision camera for a vehicle, the vision camera needs to capture video information under all types of lighting conditions. Vision cameras are able to operate at normal lighting conditions where there is sufficient daylight. However, vehicles must also operate in conditions where lighting is low, due to shading, and of course during early morning or early evening hours. Vehicles must operate during nighttime. During nighttime hours, lighting may be provided by street lights or other sources including the vehicle's own headlights and backup lights, but those sources may not sufficiently provide lighting for specific objects that the camera may be focused on. There is a need to provide light that covers the field of view of the vision camera under all lighting conditions, especially during conditions of low light and darkness. Although conditions of low light and darkness relate to conditions where visible light is low to non-existent, other wavelengths of electromagnetic radiation may be used. Lighting conditions may be enhanced using a source of visible light, such as a camera flash or other camera lighting source. However, camera flash or other camera lighting needs to be bright and is not practical for use on vehicles, as vehicles generally have specific lighting constraints, for purposes of safety and other reasons. Also vehicles are generally equipped with headlights, high beam lights, fog lights, and backup lights, which may obscure a camera light. In terms of safety, camera flash and camera lighting will blind pedestrians and other drivers.

One approach to providing lighting for low light and dark conditions has been to use infrared radiation. Infrared radiation generally is a range of the electromagnetic spectrum that is not visible to humans but is in a range than can be captured by cameras. Infrared radiation used as a source of camera lighting includes wavelengths that are near the visible range, referred to as near-infrared. Near-infrared is defined as electromagnetic radiation over the range of 0.75 to 1.4 micro meters.

Infrared radiation, similar to visible light, may be reflected off of objects, even including some black objects. Vision cameras may be provided with infrared radiation in order to enhance image capture during low light and nighttime conditions. Subsequently, infrared radiation may be used to augment the available ambient light.

There are various devices that may be used as a source for infrared radiation. Light emitting diodes (LEDs) are increasingly being used to transmit infrared radiation as they are energy efficient and can be implemented in a small space. When infrared (IR) LEDs are used for transmitting infrared (IR) radiation, they are typically enclosed by a cover that protects the LED from the environment and from being damaged. The IR LED, cover and associated mounting structure are referred to herein as an IR illuminator. The cover for the IR LED may be made IR Black using black pigments that have low infrared reflectivity. The dark lens allows IR radiation to pass, and is commonly referred to as transparent black. The transparent black cover prevents transmission of visible light.

In order to provide unobstructed radiation toward an object, a cover for an IR illuminator may be provided without a secondary optic, such as a neutral cover. In this disclosure, a neutral cover is a cover that allows visible light and infrared radiation to pass without applying optics. The cover for an IR illuminator may be clear, or may include black pigments to make a transparent black lens.

Vehicle mounted vision cameras and IR illuminators are preferably provided as an assembly, or at least the IR illuminators associated with a vision camera are positioned in close proximity to the camera in order to provide IR radiation that is within the field of view of the camera. Vehicle mounted vision cameras are becoming smaller in size, but are generally incorporated with a wide-angle lens and are limited by focal length.

Locating a camera in a low section of a vehicle, such as near the ground or near a vehicle's wheel well, can expose a camera to debris or objects that can potentially damage the camera lens or even the camera circuit itself. An IR illuminator for providing infrared light for a camera is provided with an outer cover lens mounted over the LED light source for protection as well as to filter out visible light. Some embodiments may be a compact camera assembly that has IR illuminators attached adjacent to opposing sides of a vision camera. In one embodiment, a compact vision camera and IR illuminator assembly may have a width that is 25 mm or smaller. Adding a cover over the camera in such a compact assembly has been found to be difficult. The inventors have determined that in order to accommodate a cover for the camera, in a compact assembly that includes IR illuminators, the cover for the camera may be integrated with the cover lens of the IR illuminators as a single outer cover. However, a cover for the vision camera may have different optical properties than the cover lens for the IR illuminators.

Figure 2:
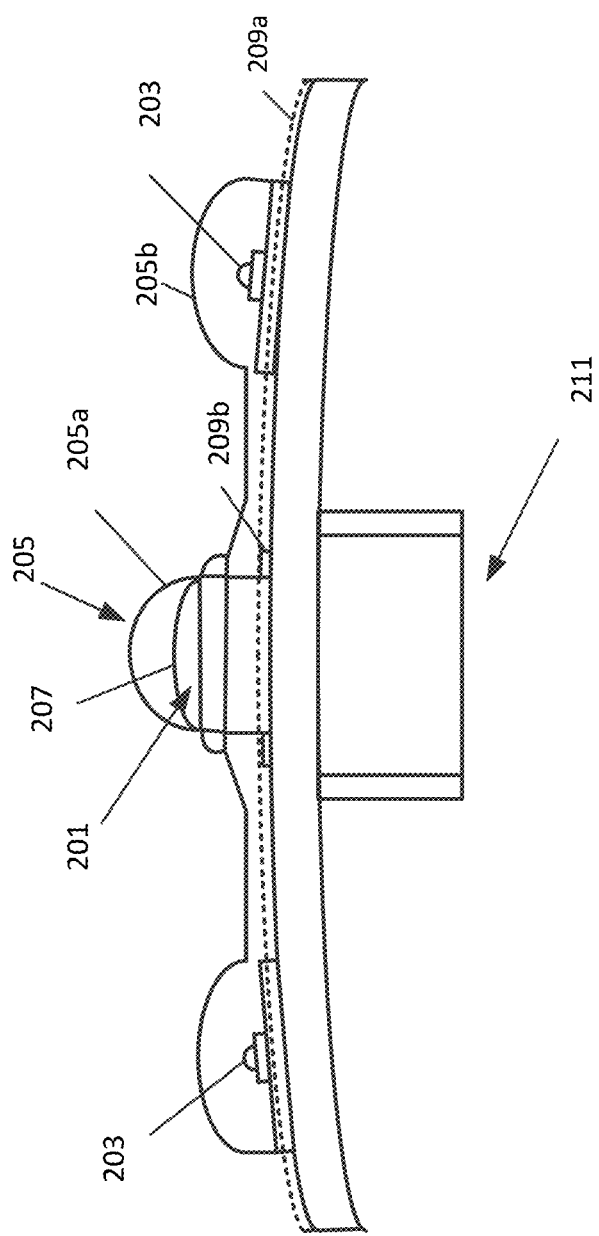
FIG. 2 illustrates a cross-section of a compact camera and illuminator structure in accordance with an exemplary aspect of the disclosure.

FIG. 2 illustrates a cross-section of a compact vision camera and illuminator assembly in accordance with an exemplary aspect of the disclosure. Specific wiring and electrical contacts are omitted in order to reduce complexity. A compact camera and illuminator assembly may include a single common mounting structure 211. In some embodiments, the compact vision camera and illuminator assembly may be integrated by way of a bracket. The mounting structure 211 or bracket preferably is of a material having some flexibility, in order to avoid breakage or cracking during installation. In some embodiments, a single outer lens 205 is used for both the vision camera 201 and IR illuminators with IR LEDs 203. The vision camera 201 includes a camera lens 207. In some embodiments, the single outer lens 205 may incorporate cover bezel portions 209a, 209b for securing the outer lens 205 and sealing the camera with the mounting structure 211. In some embodiments, the IR illuminators may each include an array of two or more IR LEDs.

In some embodiments, the mounting structure 211 or bracket may position the IR illuminators at an angle directed away from the focus axis of the vision camera 201. The single outer lens may include a neutral portion 205a that covers the vision camera 201 and a transparent black portion 205b that covers the IR LEDs 203 of the illuminators. The transparent black portion passes IR radiation and may provide other optical properties such as diffraction that increases or decreases the field of view of the IR radiation. The neutral portion 205a that covers the vision camera 201 may not provide optical properties, but primarily will provide protection for the camera lens. It is preferred that the neutral portion 205a be of a material that allows the image to be un-obstructively viewed by the vision camera. Both the neutral portion and the transparent black portion may be made of polycarbonate (PC) or polymethyl methacrylate (PMMA). PC may be used to protect against environmental conditions. In some embodiments, the single outer lens may be made of a glass laminant.

Figure 3:
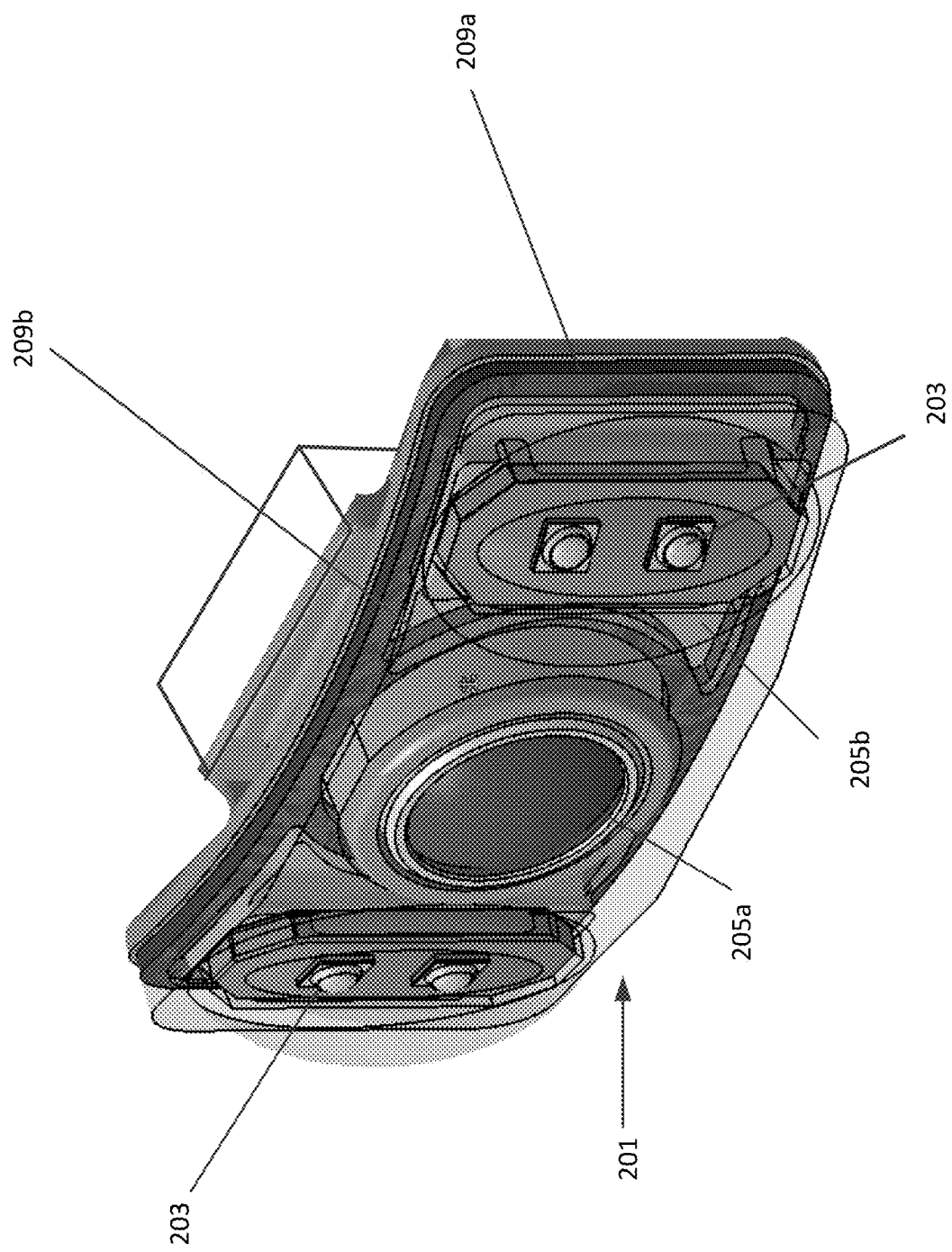
FIG. 3 illustrates a perspective view of a compact camera and illuminator structure having an outer lens.

FIG. 3 illustrates a perspective view of a compact camera and illuminator structure having an outer lens. The compact vision camera and IR illuminator assembly may include a single outer lens 205a, 205b for both the camera 201 and IR illuminators. The compact vision camera and IR illuminators may be mounted on a mounting structure 211. The single outer lens 205a, 205b may include a bezel for securing the outer lens 205a, 205b and camera lens 207. The bezel may include a portion 209a that provides a liquid seal for the single outer lens 205a, 205b and a portion 209b that provides an internal seal for the camera 201. The bezel portions 209a, 209b may be made of a plastic material that has low enough stiffness to conform to the mating surfaces and sufficient creep resistance to maintain tight seals. An example material is nylon, silicone plastic, and other rubbery materials.

In some embodiments, the IR illuminators may each include an IR LED. In some embodiments, the IR illuminators may each include an array of two or more IR LEDs. Further, although FIG. 3 illustrates a pair of IR LEDs on opposite sides of the camera 201, other arrangements are possible. For example, the IR illuminator may be arranged on a ring that encircles the camera. The ring arrangement may have IR LED's spaced equidistant around the camera. Alternatively, the ring arrangement may be a balanced arrangement where an equal number of IR LEDs are arranged on one side of the camera as a semicircular and the same on the other side of the camera.

Figure 4:
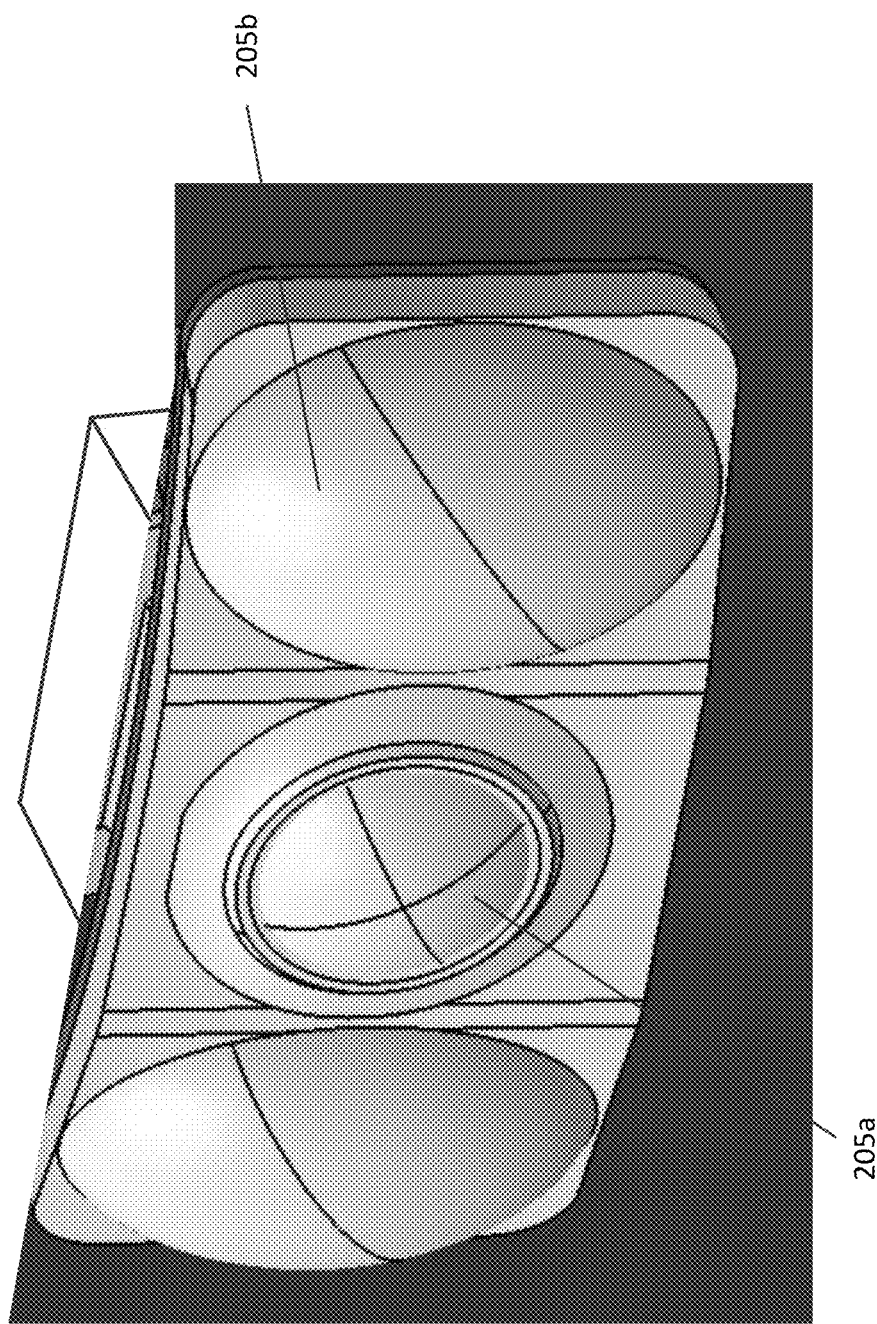
FIG. 4 illustrates a perspective view of a compact camera and illuminator structure with two-shot molded outer lens.

FIG. 4 illustrates a perspective view of a compact camera and IR illuminator structure with two-shot molded outer lens. For Two Shot Molding, a multi-shot mold may be used. There are several types of multi-shot molding techniques available, such as over-molds, core-back, and multi-station molds. The mold type generally depends on part geometry, volume, quality, and molder capacity/capability. Two-shot molding may be performed using two independent injection units that inject two resin materials into a single, multi-chambered mold.

In one embodiment, the outer lens may be molded as a transparent black cover 205*b* bonded to a neutral cover 205*a* for the camera lens. In some embodiments, the transparent black cover 205*b* is an elliptical shape having an oval peripheral, and an inner surface that is of a different shape than the external surface such that the thickness of the elliptical cover lens varies. The variation in thickness of the cover lens provides IR light distribution that is wider than the distribution pattern of the IR LED. The neutral cover lens 205*a* for the camera lens may have a circular peripheral and dome shape. The material of the transparent black cover 205*b* and neutral cover 205*a* may be the same, except that black pigments may be added to the transparent black cover 205*b*. In some embodiments, the material of the transparent black cover 205*b* and neutral cover 205*a* may be different, but compatible resins.

In some embodiments, the compact camera and IR illuminator structure may include a three-shot molded outer lens. In addition to one region for the neutral cover lens 205*a* and another region 205*b* for the transparent black cover, a third molded section may be included as a shielded region having light absorption properties. The single outer lens having a third molded section may be produced using a three (3)-shot molding process. Three-shot molding may be performed using three independent injection units that inject three resin materials into a single, multi-chambered mold. The shielded region may be sections of the single cover lens that are between the camera lens portion 205*a* and each of the transparent black regions 205*b*. The shielded region may be of a material that absorbs light and does not provide other optical properties such as light diffraction. The shielded region may function to prevent visible light from entering into the IR LEDs or indirectly entering the camera lens. In some embodiments, the shielded region may be of a material that prevents transmission of both IR radiation and visible light to prevent IR light from entering the camera lens.

In some embodiments, the cover lens portion 205*a* may include optical properties that supplement the properties of the camera lens 207. The cover lens 205*a* may filter light so that only light within a specific wavelength range is allowed to enter into the camera sensor. For example, the camera may be made to only capture images based on IR radiation in order to alleviate affects that may occur due to variations in lighting conditions due to sunlight as well as artificial light. The cover lens 205*a* may skew the image so that the image that enters the camera sensor is less curved that an image that is obtained by a wide-angle lens. The cover lens 205*a* may improve the camera view, such as by reducing glare from exceptionally bright conditions, and repelling water.

Figure 5:
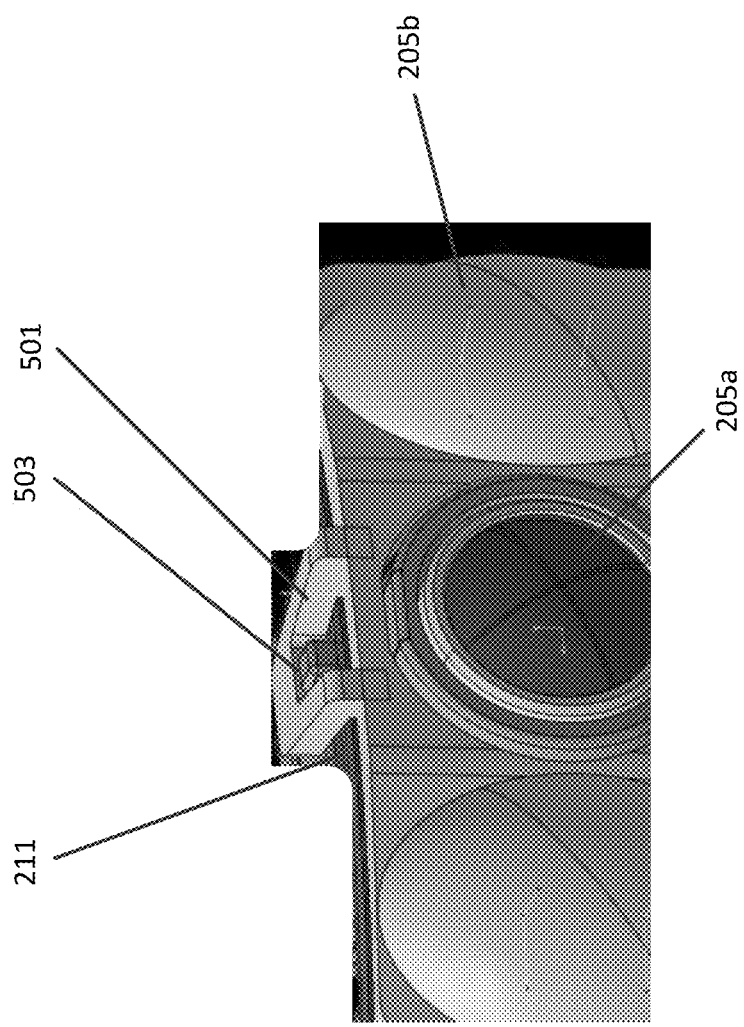
FIG. 5 illustrates a perspective view of a mount for an outer lens of the compact camera and illuminator structure.

FIG. 5 illustrates a perspective view of a mount for an outer lens of the compact camera and illuminator structure. The outer lens may be attached to the camera and illuminator structure by an adhesive. However, an adhesive may not be reliable, as it may degrade over time. Also, some gaps in the adhesive may result. In each case, leakage may occur that allows moisture to enter the space under the outer lens. In some embodiments, an attachment mechanism may be used to secure the single outer lens 205 to the mount structure on which the camera and IR illuminator are mounted. In one embodiment, as shown in FIG. 5, the single outer lens 205 may be attached by a flexible snap latch 501 that tightly fits over a protrusion 503 on the mount structure. In the embodiment, two flexible snap latches 501 may be provided on opposite sides of the single cover lens 205. In some embodiments, more than two flexible snap latches 501 may be provided on opposing sides of the single cover lens. For example, a pair of flexible snap latches 501 may be provided on two opposing sides of the single cover lens 205, and another pair of flexible snap latches 501 may be provided on the other set of opposing sides.

The snap latch 501 may be an integral part of the cover lens that is formed during double-shot molding. Alternatively, the snap latch may be a separate component that is secured over a protrusion extending from the cover lens. In the latter case, the separate snap latch may be made of metal or plastic, or even include an elastic material. The protrusion may be in the form of a hook to prevent the snap latch from coming loose and slipping off of the protrusion.

Numerous modifications and variations of the present invention are possible in light of the above teachings. It is therefore to be understood that within the scope of the appended claims, the invention may be practiced otherwise than as specifically described herein.

The invention claimed is:

1. A compact digital camera and infrared (IR) illuminator apparatus, comprising:
   a plurality of IR illuminators arranged adjacent to the digital camera,
   the digital camera having a camera lens,
   each IR illuminator including at least one IR light emitting diode (LED); and
   a single cover lens positioned to cover the at least one IR LED and the camera lens,
   wherein a region of the single cover lens that covers the at least one IR LED blocks visible light and a region of the single cover lens that covers the camera lens is a neutral lens that transmits visible light.

2. The compact digital camera and IR illuminator apparatus of claim 1, wherein the single cover lens is a two-shot molded lens.

3. The compact digital camera and IR illuminator apparatus of claim 2, wherein material of the region of the single cover lens that covers the at least one IR LED and material of the region of the single cover lens that covers the camera lens are the same.

4. The compact digital camera and IR illuminator apparatus of claim 2, wherein the region of the single cover lens that covers the at least one IR LED is transparent black.

5. The compact digital camera and IR illuminator apparatus of claim 2, wherein the region of the single cover lens that covers the at least one IR LED and the region of the single cover lens that covers the camera lens are of different materials.

6. The compact digital camera and IR illuminator apparatus of claim 5, wherein material of the region of the single cover lens that covers the at least one IR LED and material of the region of the single cover lens that covers the camera lens are compatible resins.

7. The compact digital camera and IR illuminator apparatus of claim 1, wherein the single cover lens is a three-shot molded lens.

8. The compact digital camera and IR illuminator apparatus of claim 7, wherein the three-shot molded lens includes a light shielding region that is between the region that covers the at least one IR LED and the region that covers the camera lens, wherein the shielding region has light absorption properties.

9. The compact digital camera and IR illuminator apparatus of claim 8, wherein the shielding region prevents transmission of both IR radiation and visible light.

10. The compact digital camera and IR illuminator apparatus of claim 1, wherein the region of the single cover lens that covers the camera lens filters radiation in predetermined wavelengths.

11. The compact digital camera and IR illuminator apparatus of claim 1, wherein the single cover lens includes a bezel for securing the camera lens.

12. The compact digital camera and IR illuminator apparatus of claim 1, wherein the single cover lens includes a bezel having a portion that provides a liquid seal for the single cover lens and a portion that provides an internal seal for the camera.

13. The compact digital camera and IR illuminator apparatus of claim 1, wherein the digital camera has an optic axis in a direction of focus,
wherein a center axis of IR illuminator is tilted by an angle greater than or equal to five degrees.

14. The compact digital camera and IR illuminator apparatus of claim 1, wherein a top surface of the region of the single cover lens that covers the at least one IR LED is positioned below a field of view of the camera.

15. The compact digital camera and IR illuminator apparatus of claim 13, wherein a field of view of an emission pattern of IR radiation is substantially plus or minus 80 degrees or greater from the optic axis.

16. The compact digital camera and IR illuminator apparatus of claim 1, further including a mounting structure,
wherein a pair of mounting substrates are arranged adjacent to the digital camera and the at least one IR LED is mounted to each of the mounting substrates,
wherein each of the pair of mounting substrates and IR LED mounted thereon are identical.

17. The compact digital camera and IR illuminator apparatus of claim 1, further including a single mounting structure that supports the plurality of IR illuminators and camera.

18. The compact digital camera and IR illuminator apparatus of claim 1, wherein the region of the single cover lens that covers the at least one IR LED applies an optical property to IR radiation.

19. The compact digital camera and IR illuminator apparatus of claim 18, wherein the optical property applied is a diffraction optic that increases or decreases a field of view of IR radiation of the respective IR illuminator.

20. The compact digital camera and IR illuminator apparatus of claim 17, wherein the single cover lens is attached to the mounting structure by a snap latch, one end of which is an integral part of the single cover lens.

* * * * *